(12) United States Patent
Martin

(10) Patent No.: US 8,696,286 B1
(45) Date of Patent: Apr. 15, 2014

(54) PIVOTING HUB NUT

(75) Inventor: Jason Martin, Murfreesboro, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 671 days.

(21) Appl. No.: 12/884,589

(22) Filed: Sep. 17, 2010

(51) Int. Cl.
*F16B 37/08* (2006.01)

(52) U.S. Cl.
USPC ............... 411/432; 411/437; 411/540; 269/6; 269/95

(58) Field of Classification Search
USPC ......... 411/432–433, 437, 540; 285/38; 269/3, 269/6, 95, 97, 143, 249; 29/270, 244, 255, 29/278
See application file for complete search history.

(56) References Cited

U.S. PATENT DOCUMENTS

| | | | | |
|---|---|---|---|---|
| 663,208 A | * | 12/1900 | Wrensch | 411/433 |
| 674,105 A | * | 5/1901 | Timm | 408/162 |
| 888,563 A | * | 5/1908 | Wilkins | 408/180 |
| 948,600 A | * | 2/1910 | Vannoy | 411/540 |
| 1,231,450 A | * | 6/1917 | Sutton | 138/96 T |
| 1,344,194 A | * | 6/1920 | Wright | 411/540 |
| 1,366,884 A | | 1/1921 | Nahrung | |
| 1,510,492 A | * | 10/1924 | Caron et al. | 411/432 |
| 1,762,065 A | * | 6/1930 | Lally | 285/33 |
| 1,803,888 A | | 5/1931 | Basola et al. | |
| 1,951,581 A | | 3/1934 | Smith et al. | |
| 2,649,314 A | * | 8/1953 | Richardson | 285/33 |
| 2,664,023 A | | 12/1953 | Mugford | |
| 2,676,509 A | | 4/1954 | Graham | |
| 2,719,025 A | * | 9/1955 | Stone | 173/167 |
| 2,976,012 A | * | 3/1961 | Allen | 415/9 |
| 3,431,623 A | * | 3/1969 | Smeets | 29/240 |
| 3,815,434 A | * | 6/1974 | Seger | 74/424.79 |
| 3,856,421 A | * | 12/1974 | Nogler | 403/118 |
| 3,878,758 A | | 4/1975 | Reed | |
| 4,048,897 A | * | 9/1977 | Price, Jr. | 411/433 |
| 4,072,369 A | * | 2/1978 | Segreto | 175/325.7 |
| 4,132,146 A | | 1/1979 | Uhlig | |
| 4,221,363 A | * | 9/1980 | Jasper | 254/98 |
| 4,274,323 A | | 6/1981 | Resnicow | |
| 4,332,169 A | | 6/1982 | Stuart | |
| 4,433,578 A | | 2/1984 | Hill | |
| 4,462,731 A | | 7/1984 | Rovinsky et al. | |
| 4,478,546 A | | 10/1984 | Mercer | |
| 4,531,872 A | | 7/1985 | Warkotsh | |
| 4,556,352 A | * | 12/1985 | Resnicow | 411/433 |
| 4,572,032 A | | 2/1986 | Kinzler | |
| 4,657,458 A | | 4/1987 | Woller et al. | |

(Continued)

*Primary Examiner* — Victor Batson
*Assistant Examiner* — Tyler Johnson
(74) *Attorney, Agent, or Firm* — Waddey Patterson; Mark J. Patterson; Matthew C. Cox

(57) ABSTRACT

A pivoting hub nut, or hub clamp, for manually securing an object to a rotatable shaft provides a first hub defining a first radial slot and a second hub pivotally attached to the first hub defining a second radial slot. A first handle extends from the first hub, and a second handle extends from the second hub. A latch is disposed on the clamp for selectively locking the clamp in a closed position. An axial bore is defined along the centerline, or hub axis of rotation, of the clamp. The clamp includes a threaded region facing the axial bore for engaging corresponding threads on the shaft. Upon installation of the clamp onto the shaft, the clamp can be rotated relative to the shaft in a closed position for adjusting the longitudinal, or axial, placement of the clamp on the shaft, and the clamp can be tightened against a wheel rim or other object for securing the object on the shaft.

22 Claims, 12 Drawing Sheets

(56) References Cited

U.S. PATENT DOCUMENTS

| | | | |
|---|---|---|---|
| 4,697,830 A * | 10/1987 | Wood et al. | 285/27 |
| 4,768,909 A | 9/1988 | Warkotsch | |
| 4,930,961 A | 6/1990 | Weis | |
| 5,039,266 A | 8/1991 | Nagayoshi et al. | |
| 5,340,252 A | 8/1994 | Weddendorf | |
| 5,466,106 A | 11/1995 | Bone et al. | |
| 5,755,544 A | 5/1998 | Muller et al. | |
| 5,906,464 A | 5/1999 | Wedenig | |
| 6,206,620 B1 | 3/2001 | Burns | |
| 6,290,446 B1 | 9/2001 | Warkotsch et al. | |
| 6,361,260 B1 | 3/2002 | Schirrmacher | |
| 6,514,027 B1 | 2/2003 | Yiu et al. | |
| 6,666,639 B2 * | 12/2003 | Van Gent | 411/432 |
| 6,821,070 B1 | 11/2004 | Thompson | |
| 6,974,291 B2 | 12/2005 | Li | |
| 6,994,503 B2 | 2/2006 | Blatz | |
| D557,594 S * | 12/2007 | Whipple | D8/373 |
| 7,338,246 B2 | 3/2008 | Caspi | |
| 7,338,247 B2 * | 3/2008 | Ateca | 411/433 |
| 7,661,915 B2 * | 2/2010 | Whipple | 411/151 |
| 7,946,540 B2 * | 5/2011 | Drane et al. | 248/65 |
| 8,206,072 B2 * | 6/2012 | Wagner | 411/433 |
| 2002/0164227 A1 * | 11/2002 | Van Gent | 411/432 |
| 2008/0080956 A1 * | 4/2008 | Whipple | 411/433 |
| 2009/0162166 A1 * | 6/2009 | Hohmann et al. | 411/433 |
| 2009/0266962 A1 * | 10/2009 | Drane et al. | 248/314 |
| 2009/0267035 A1 * | 10/2009 | Wood et al. | 254/98 |

\* cited by examiner

PIVOTING HUB NUT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to machinery and tools for securing one or more objects to a shaft. More particularly, the present invention relates to devices used for securing a wheel assembly to a threaded shaft of a wheel servicing machine.

Mechanical devices, including clamps and nuts, for securing objects to a threaded shaft are known in the art. In one common application, a vehicle wheel assembly, including a wheel rim, is mounted on a threaded shaft of a wheel servicing machine for performing wheel servicing operations, such as wheel balancing and mounting or dismounting a tire. In such applications, the wheel rim generally includes a center mounting hole. The center mounting hole is generally shaped to receive a horizontal or vertical shaft extending from a wheel servicing machine. The wheel rim is positioned on the shaft, and the wheel is secured to the shaft using a mechanical securement means. Typically, the shaft is threaded and a threaded nut, or threaded clamp, is screwed onto the threaded shaft at an axial end point of the shaft and rotated such that the threaded nut or threaded clamp advances axially toward the wheel rim. Eventually, the threaded nut or threaded clamp engages the wheel rim and is tightened so that the wheel rim is secured to the wheel servicing machine. From this position, the shaft can be rotated for performing wheel servicing operations, such as tire mounting, dismounting or wheel balancing.

Conventional threaded clamp and threaded nut devices for securing a wheel to a threaded shaft typically require the user to initially install the clamp or nut onto the shaft at a free end of the shaft. The clamp or nut is subsequently rotated toward the wheel. In many conventional configurations, the clamp or nut must be rotated numerous times to advance the clamp or nut toward the wheel rim prior to actual engagement with the wheel. In some applications, the excessive number of initial rotations of the clamp or nut prior to engagement with the wheel requires additional time and effort by an operator and can reduce machine throughput and operator efficiency. Moreover, by adding additional time to the wheel clamping procedure, such conventional clamps and nuts can increase cost to the consumer. Further, the repeated threading and unthreading of conventional clamps and nuts along the entire shaft length can cause accelerated mechanical wear and damage to the threaded shaft.

Others have attempted to address the problems of conventional hub nut and hub clamp designs. For example, U.S. Pat. No. 6,821,070 provides a hinged split nut having first and second threaded nut sections for radial installation on a longitudinal shaft. Conventional split nut, or split clamp, designs typically provide a split fastener that, once installed, must be re-positioned or tightened on a shaft using a separate tool, such as a wrench. The requirement of an additional tool, such as a wrench, for installing conventional split fasteners adds complexity and increases the number of parts necessary for fastener installation. Additionally, the requirement of a separate tool for fastener positioning, in some applications, can also complicate the removal, or release, of the fastener from the shaft, further reducing machine throughput.

What is needed, then, is a quick-release pivoting hub nut apparatus with one or more handles extending therefrom so that the hub nut apparatus can be manually installed radially onto and removed radially from a threaded shaft.

BRIEF SUMMARY OF THE INVENTION

One aspect of the present invention provides a clamping apparatus for clamping a wheel to a shaft on a wheel servicing machine. The apparatus includes a first hub defining a first radial slot. A second hub is pivotally attached to the first hub. The second hub defines a second radial slot. A first handle extends from the first hub, and a second handle extends from the second hub.

Yet another aspect of the present invention provides a rotatable clamping apparatus for use on a threaded shaft. The apparatus includes a first hub and a second hub pivotally attached to the first hub. The first and second hubs are axially aligned along a hub axis of rotations. The first and second hubs define an axial bore centered along the hub axis of rotation. A threaded insert is disposed in the axial bore. A first handle extends radially from the first hub, and a second handle extends radially from the second hub.

An additional aspect of the present invention provides a pivoting hub nut for securing a wheel to a threaded shaft of a wheel servicing machine. The hub nut includes a first handle having a first U-shaped hub extending from the first handle. The first U-shaped hub defines a first radial slot shaped for receiving the shaft. A second handle includes a second U-shaped hub extending from the second handle. The second U-shaped hub defines a second radial slot shaped for receiving the shaft. The first U-shaped hub is pivotally attached to the second U-shaped hub.

A further aspect of the present invention provides a clamping apparatus for securing a wheel to a threaded shaft on a wheel servicing machine. The apparatus includes a first hub and a second hub pivotally attached to the first hub. A partially-threaded U-shaped bushing is disposed on the second hub. The bushing includes a thread configuration adapted for engaging the threaded shaft. A first handle protrudes radially from the first hub, and a second handle protrudes radially from the second hub. The first and second hubs are axially aligned along a hub axis of rotation and are angularly offset when the first and second handles are collinearly aligned in a closed position.

Yet another aspect of the present invention provides a method of securing a wheel to a shaft of a wheel servicing machine. The method includes the steps of: (a) providing a wheel having a center hole and a wheel servicing machine having an elongated threaded shaft; (b) providing a wheel clamping apparatus having a first hub, a second hub, a first handle, a second handle, and a threaded region defined along an axial bore, wherein the first and second hubs are rotatable relative to each other about a hub axis of rotation; (c) positioning the wheel on the wheel servicing machine by inserting the shaft through the center hole; (d) radially installing the wheel clamping apparatus onto the shaft near the wheel; (e) rotating the first and second hubs relative to each other using first and second handles to lock the wheel clamping apparatus onto the shaft; and (f) rotating the wheel clamping apparatus to tighten the wheel clamping apparatus against the wheel.

Numerous other objects, features and advantages of the present invention will be readily apparent to those skilled in the art upon a reading of the following disclosure when taken in conjunction with the accompanying drawings.

DETAILED DESCRIPTION

Figure 1:
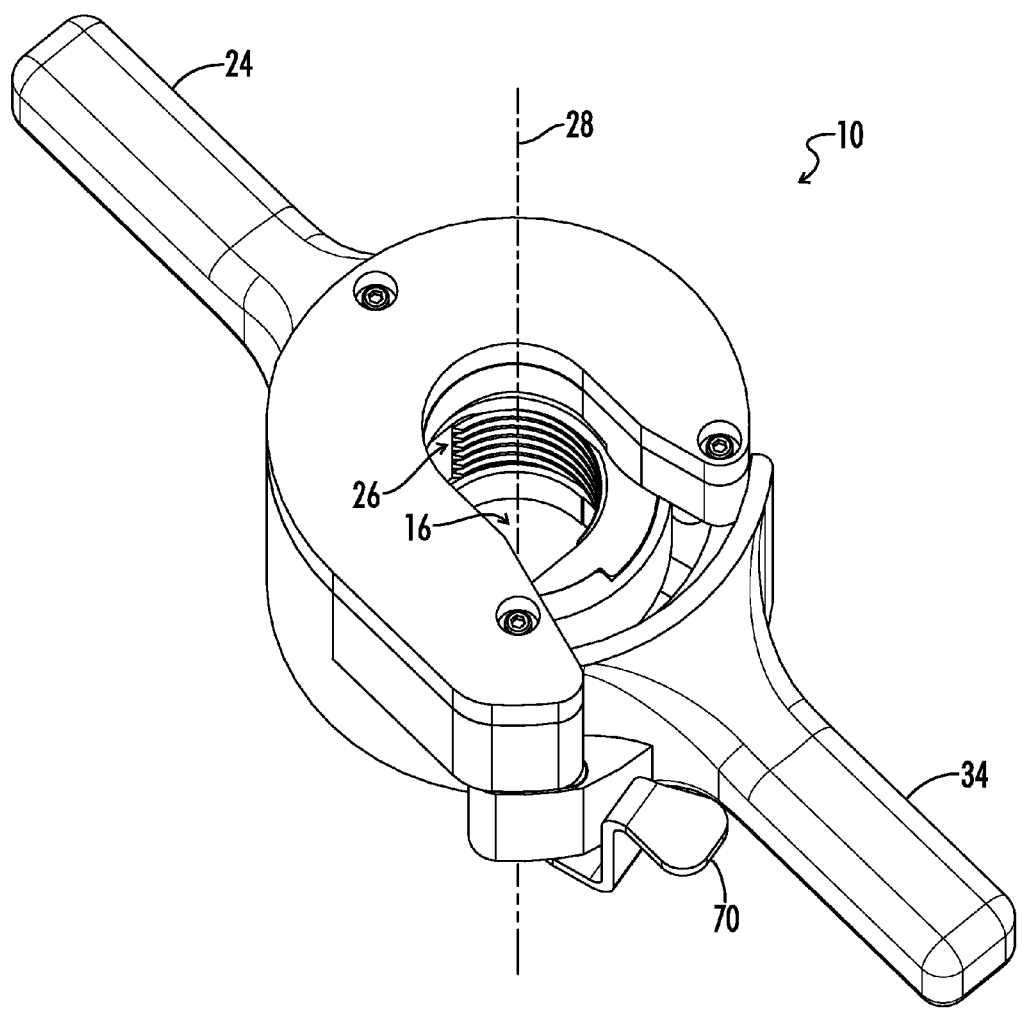
FIG. 1 illustrates a perspective view of one embodiment of a clamp apparatus in accordance with the present invention.

Referring now to the drawings, FIG. 1 illustrates a perspective view of one embodiment of a clamping apparatus, or hub nut, generally designated by the numeral 10. In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Referring further to FIG. 1, a wheel clamping apparatus, or pivoting hub nut 10, includes a first handle 24 and a second handle 34. The clamping apparatus 10 defines an axial bore 16 shaped for engaging a shaft. A threaded region 26 is included on the wheel clamping apparatus 10 facing axial bore 16. The threaded region 26 in some embodiments extends only partially around the inner perimeter of axial bore 16. In one embodiment, the threaded region 26 extends an angular distance no more than one-half the inner circumference of axial bore 16.

Figure 2A:
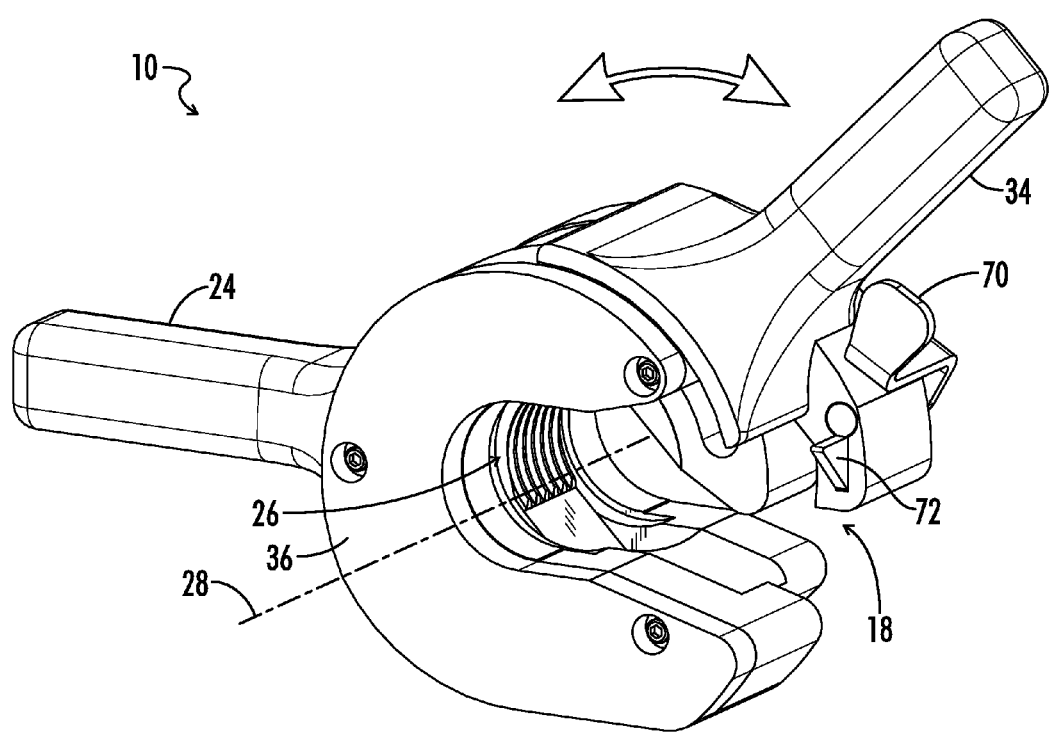
FIG. 2A illustrates a perspective view of the clamp apparatus of FIG. 1 in a partially opened position.
Figure 2B:
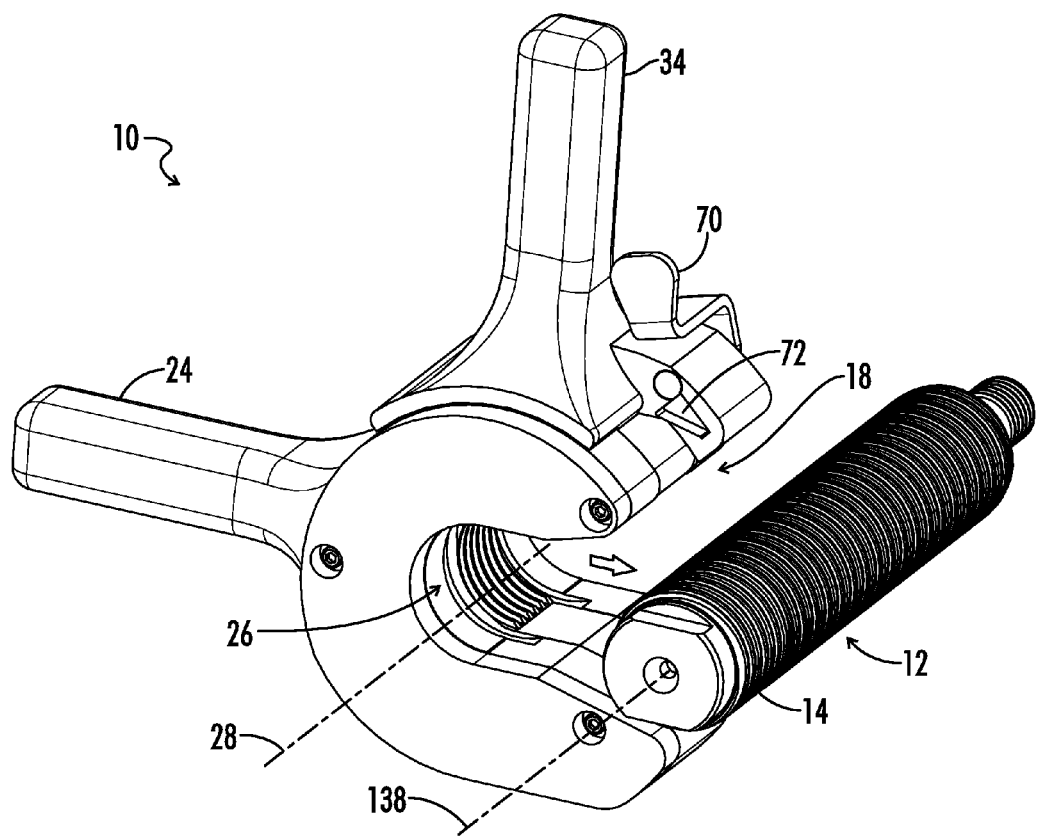
FIG. 2B illustrates a perspective view of the clamp apparatus of FIG. 1 in a fully opened position.
Figure 2C:
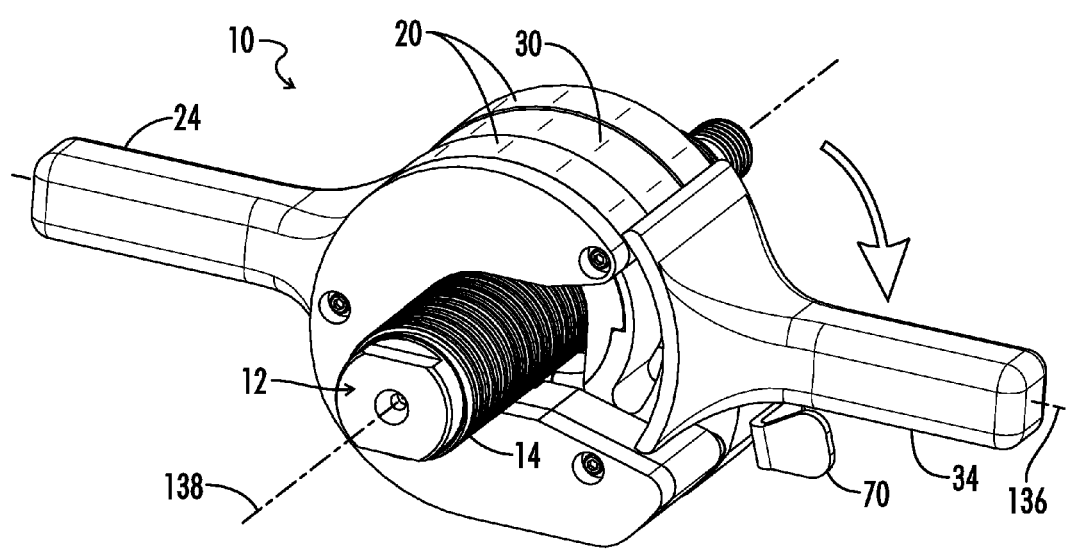
FIG. 2C illustrates a perspective view of the clamp apparatus of FIG. 1 in a fully closed position secured to a threaded shaft.

Referring to FIG. 2A, wheel clamping apparatus 10 can be opened by rotating first and second handles 24, 34 angularly toward each other. When wheel clamping apparatus 10 is fully opened, as illustrated in FIG. 2B, a mouth 18 forms a radial opening in apparatus 10. Mouth 18 is generally shaped for receiving a shaft 12. In some embodiments, shaft 12 includes shaft threads 14 adapted to correspond to threaded region 26. Clamp apparatus 10 can be radially installed onto and radially removed from shaft 12. The radial attachment configuration illustrated in FIG. 2B allows clamping apparatus 10 to be installed on shaft 12 at a longitudinal location along the length of shaft 12 without having to thread clamp apparatus 10 onto an axial end of shaft 12. After the clamping apparatus 10 is positioned on shaft 12, second handle 34 can be rotated away from first handle 24, as seen in FIG. 2C, thereby securing clamping apparatus on shaft 12. When clamping apparatus 10 is secured on shaft 12 as seen in the configuration illustrated in FIG. 2C, the threaded region on clamp apparatus 10 engages the shaft threads 14. From the closed position seen in FIG. 2C, the entire clamping apparatus 10 can then be rotated relative to shaft 12 about hub axis of rotation 138, thereby moving clamping apparatus 10 axially along shaft 12 and securing, or clamping, an object such as a wheel assembly also positioned on shaft 12.

Figure 3:
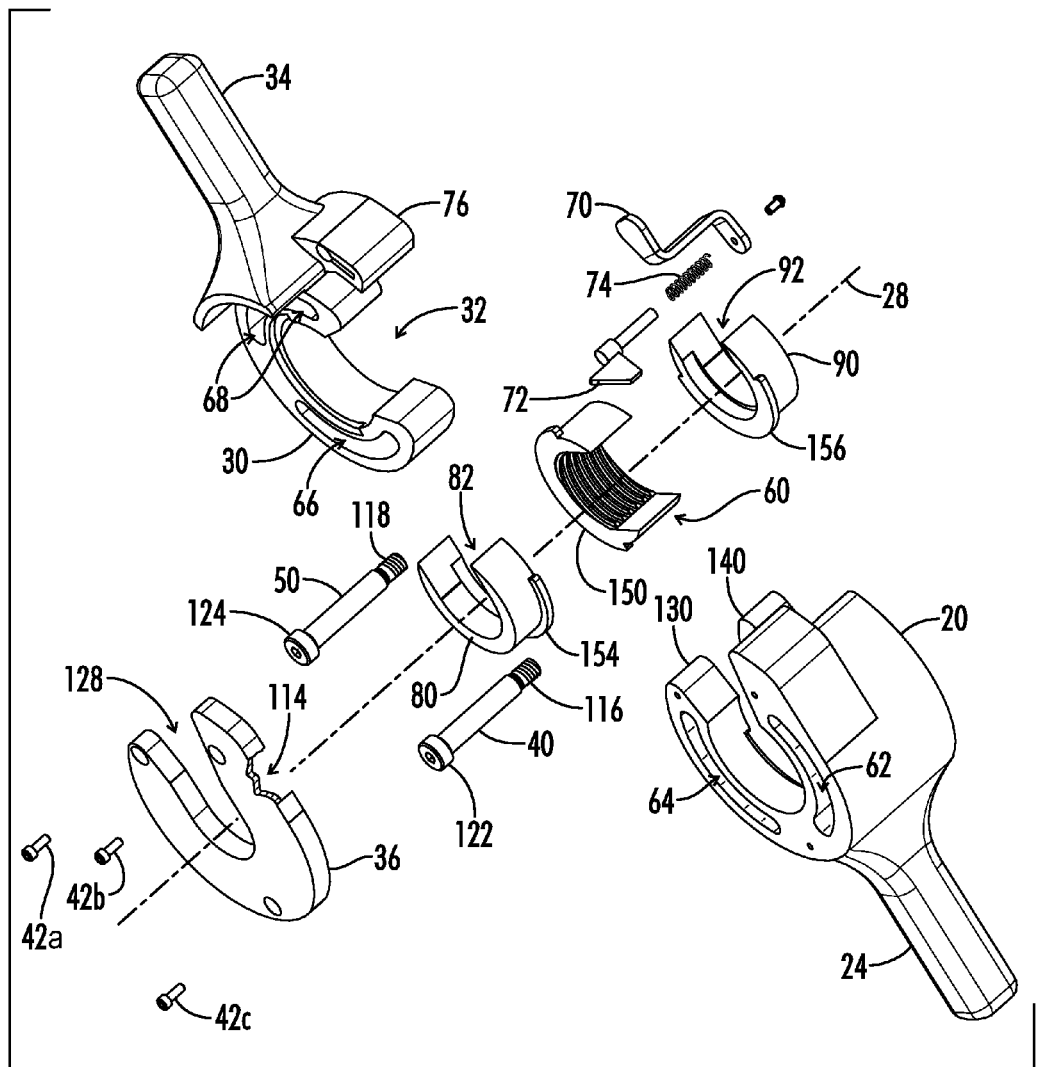
FIG. 3 illustrates an exploded perspective view of one embodiment of a clamping apparatus in accordance with the present invention.
Figure 4:
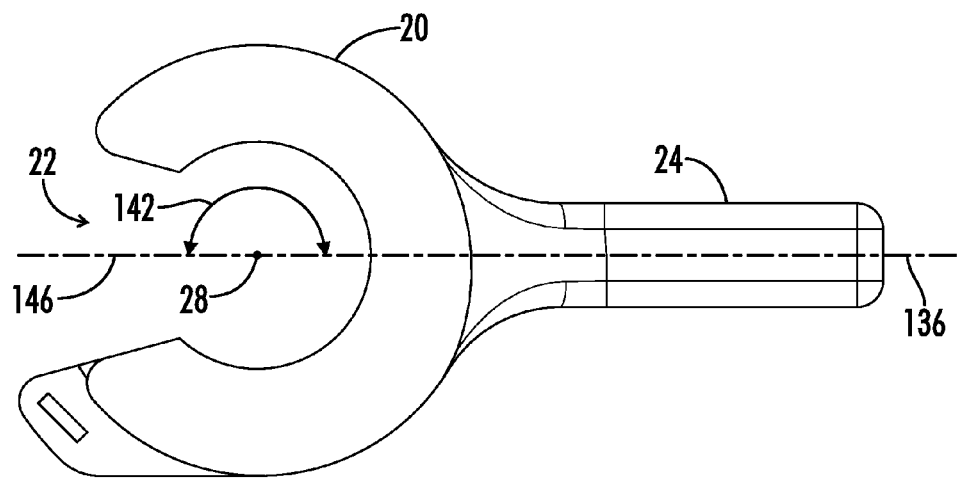
FIG. 4 illustrates a bottom view of one embodiment of the first hub of FIG. 3 in accordance with the present invention.
Figure 5:
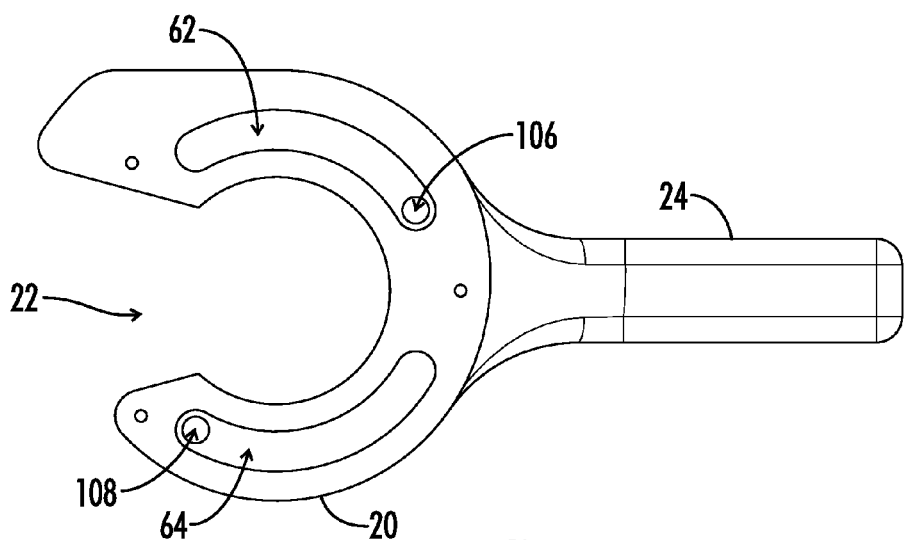
FIG. 5 illustrates a top view of the first hub of FIG. 3 in accordance with the present invention.

Referring now to the view illustrated in FIG. 3, in one embodiment a clamping apparatus 10 for clamping a wheel assembly to a shaft on a wheel servicing machine includes a first hub 20 defining a first radial slot 22, also seen in FIG. 4 and FIG. 5, and a second hub 30 defining a second radial slot 32. In an assembled clamping apparatus, second hub 30 is pivotally attached to first hub 20 and is rotatable relative to first hub 20. First and second hubs 20, 30 are each rotatable about a common hub axis of rotation 28.

Figure 6:
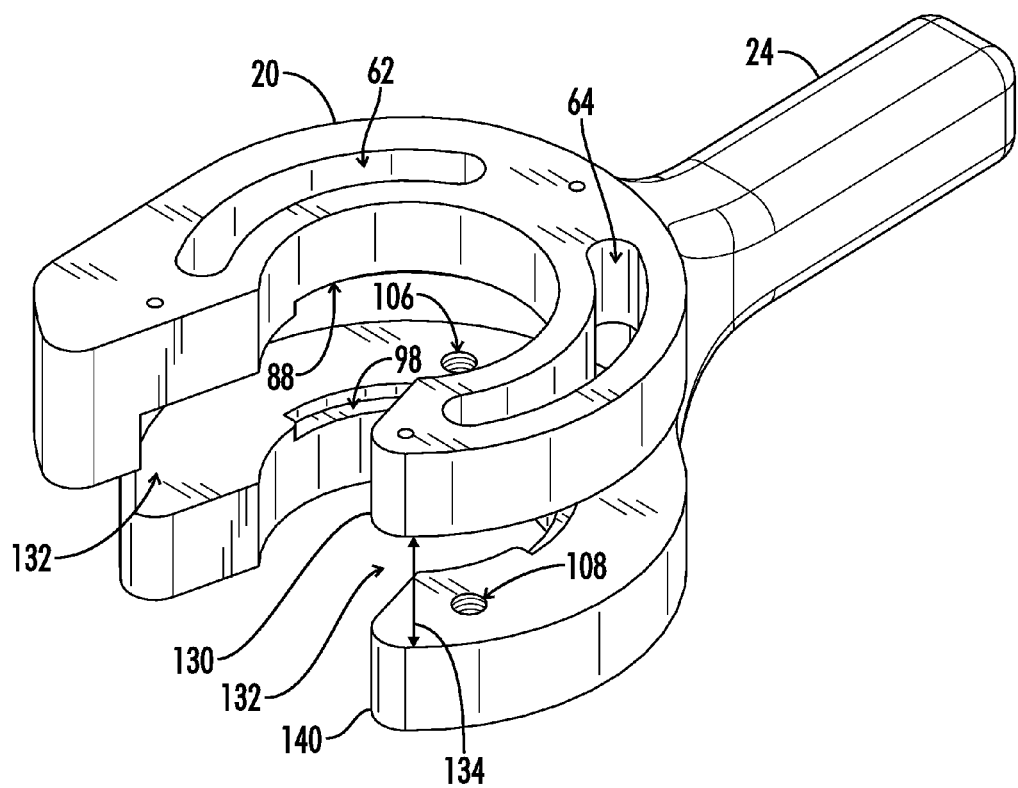
FIG. 6 illustrates a perspective view of the first hub of FIG. 3 in accordance with the present invention.

Referring now to FIG. 6, in some embodiments, first hub 20 defines a first layer 130 and a second layer 140 separated by a hub gap 132. Hub gap 132 in some embodiments extends circumferentially around first hub 20. Hub gap 132 is generally shaped for receiving second hub 30. As such, in some embodiments, hub gap 132 defines a hub gap height 134, seen in FIG. 6. The hub gap height 134 is substantially equal to second hub thickness 126, seen in FIG. 9A, such that second hub 30 can be inserted into and can rotate in hub gap 132.

Referring again to FIG. 6, in some embodiments, first hub 20 includes a first angular slot 62 and a second angular slot 64 defined in first layer 130. First hub 20 also defines a first fastener hole 106 and a second fastener hole 108 in second layer 140, also seen in FIG. 5. First and second pivot pins 40, 50, seen in FIG. 3, can be inserted through first and second angular slots 62, 64 respectively. First pivot pin 40 in some embodiments includes a first threaded end 116 configured for engaging corresponding threads defined in first fastener hole 106. Similarly, second pivot pin 50 in some embodiments includes a second threaded end 118 configured for engaging corresponding threads defined in second fastener hole 108. When first and second pivot pins 40, 50 are inserted in first and second angular slots 62, 64 on first hub 20, each first and second pivot pin 40, 50 rigidly spans hub gap 132. The regions of first and second pivot pins 40, 50 spanning hub gap 132 in some embodiments are substantially smooth and cylinder-shaped.

Figure 7:
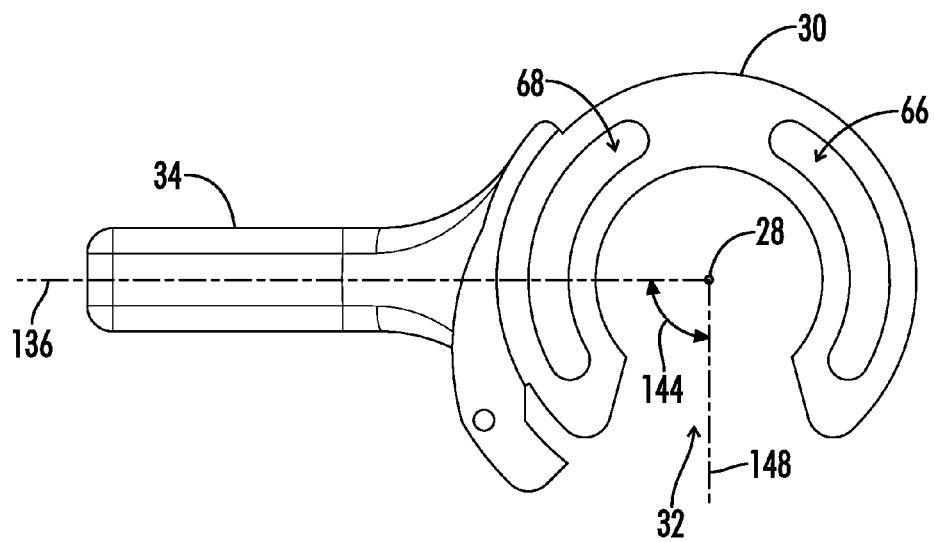
FIG. 7 illustrates a bottom view of one embodiment of a second hub in accordance with the present invention.
Figure 8:
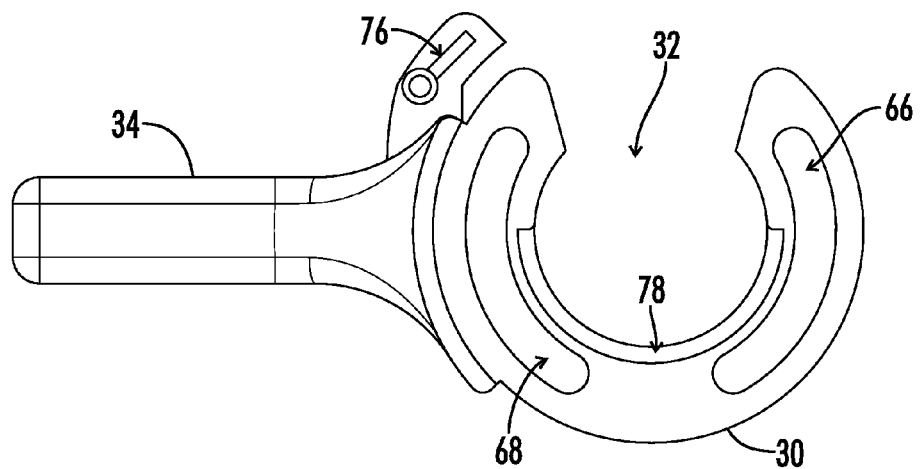
FIG. 8 illustrates a top view of the second hub of FIG. 7 in accordance with the present invention.

Referring now to FIGS. 7-9, second hub 30 defines third and fourth angular slots 66, 68. Third and fourth angular slots 66, 68 are defined entirely through second hub thickness and can be described as clearance slots. After second hub 30 is inserted in hub gap 132, first travel slot 62 is aligned with third travel slot 66, and second travel slot 64 is aligned with fourth travel slot 68. As such, first pivot pin 40 can be inserted through both first angular slot 62 and third angular slot 66; and second pivot pin 50 can be inserted through both second angular slot 64 and fourth angular slot 68. Upon insertion through first and third angular slots 62, 66, first pivot pin 40 engages first fastener hole 106. Similarly, upon insertion through second and fourth angular slots 64, 68, second pivot pin 50 engages second fastener hole 108. First and second pivot pins 40, 50 are generally rigidly fixed to first hub 20, and second hub 30 is pivotally attached to first hub 20 in hub gap 132. Second hub 30 can rotate freely a fixed angular distance as third and fourth angular slots 66, 68 on second hub 30 slidably engage first and second pivot pins 40, 50. In other embodiments, first and second angular slots 62, 64 on first hub 20 can be defined as pin clearance holes axially aligned with first and second fastener holes 106, 108.

Referring again to FIG. 3, first and second pivot pins 40, 50 in some embodiments include first and second pin heads, or bolt heads 122, 124, respectively. Each bolt head 122, 124 may extend axially away from the surface of first layer 130 on first hub 20 when installed. A cover plate 36 can be positioned on first layer 130 of first hub 20 for covering first and second bolt heads 122, 124. As seen in FIG. 3, cover plate 36 defines a plate cavity 114 shaped for accommodating first and second bolt heads 122, 124. Cover plate 36 can be secured to first hub 20 using one or more cover plate fasteners 42a, 42b, 42c. Cover plate 36 additionally includes a radial cover plate slot 128 shaped for receiving a shaft and is angularly aligned with first radial slot 22 on first hub 20, seen in FIG. 5.

Referring again to FIG. 2C, in one embodiment, when clamp 10 is installed on shaft 12, first and second handles 24, 34 are generally aligned along a handle axis 136. In some embodiments, handle axis 136 is substantially perpendicular to shaft axis of rotation 138. In some applications, the center of mass of clamp 10 is aligned with shaft axis of rotation 138 so that clamp 10 does not cause a rotational imbalance when shaft 12 is rotated, for example during wheel balancing of a wheel assembly mounted on shaft 12 and clamped in place using clamp 10. In such an application, clamp 10 does not contribute to the rotational imbalance of the wheel so that a proper measurement of imbalance forces acting on the wheel assembly during rotation can be performed, and clamp 10 is balanced about both hub axis of rotation and shaft axis of rotation.

As seen in FIG. 4, first radial slot 22 defines a first slot axis 146 along the centerline of first radial slot 22. First slot axis 146 is oriented at a first slot angle 142 relative to handle axis 136, wherein first slot angle 142 is defined using the hub axis of rotation 28 as a vertex. First slot angle 142 in one embodiment is substantially 180 degrees so that first slot axis 146 is aligned with handle axis 136. Referring now to FIG. 7, second radial slot 32 defines a second slot axis 148 along the centerline of second radial slot 32. Second slot axis 148 is oriented at a second slot angle 144. Second slot angle 144 is generally defined relative to handle axis 136, wherein the hub axis of rotation 28 forms the vertex.

A slot offset angle is defined as the difference between first slot angle 142 and second slot angle 144 when first and second handles 24, 34 are aligned along the handle axis 136, as seen generally in the closed position in FIG. 2C. In some embodiments, the slot offset angle is between about 80 and about 100 degrees. In yet another embodiment, the slot offset angle is about 90 degrees. Generally, when clamp 10 is in a fully open position, as seen in FIG. 2B, first and second slot axes 146, 148 are aligned, forming an open mouth 18 shaped for receiving shaft 12. In the fully open position, first and second handles 24, 34 in one embodiment are offset by a handle offset angle substantially equal to the slot offset angle.

Figure 9A:
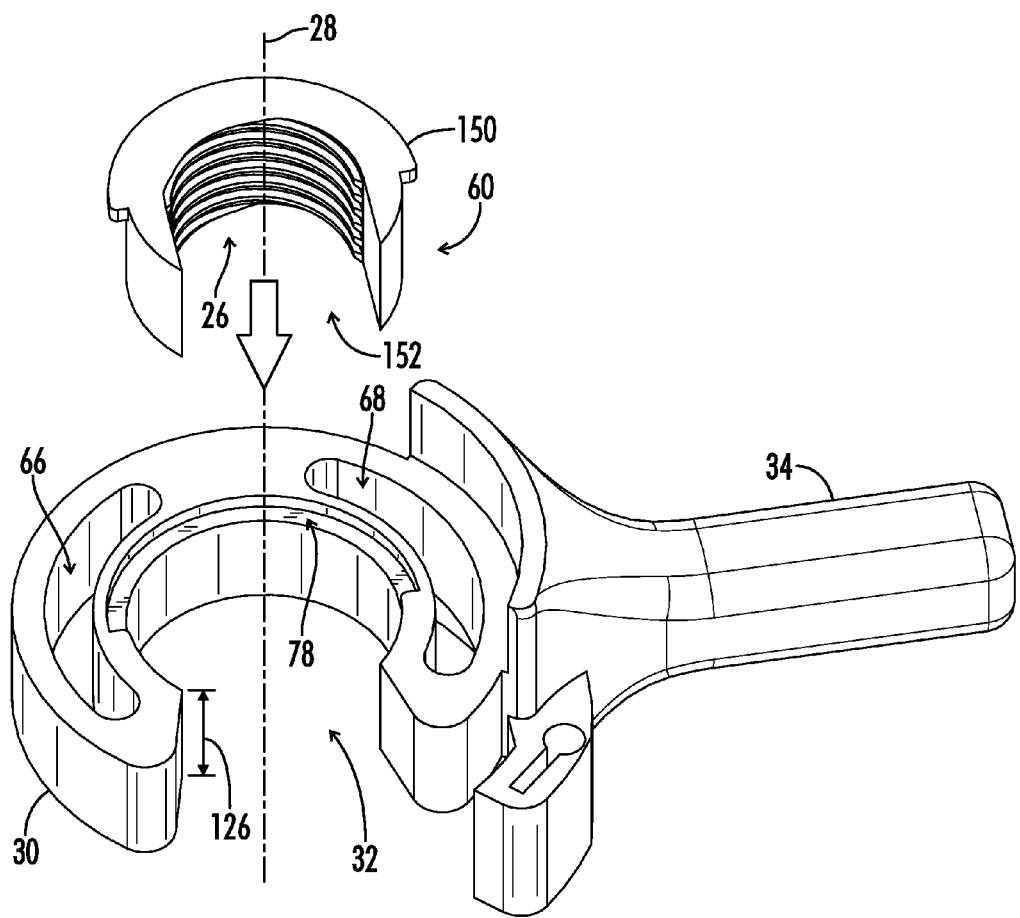
FIG. 9A illustrates an exploded perspective view of one embodiment of a second hub with a threaded insert in accordance with the present invention.
Figure 9B:
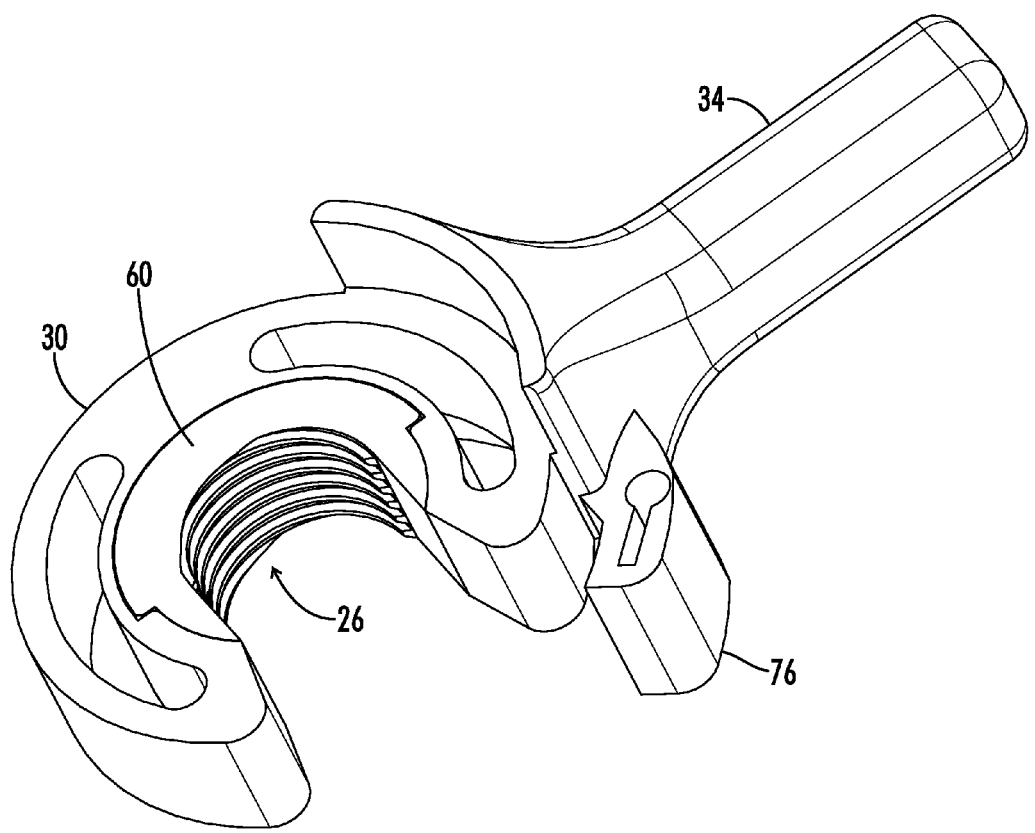
FIG. 9B illustrates a perspective view of one embodiment of a second hub with a threaded insert in accordance with the present invention.

Referring now to FIGS. 9A and 9B, a threaded insert 60 can be inserted in second radial slot 32 of second hub 30. Threaded insert 60 includes a threaded region 26 generally facing toward hub axis of rotation 28. Threaded insert 60 is U-shaped in some embodiments and includes an insert radial slot 152 substantially aligned with second radial slot 32 on second hub 30. Threaded insert 60, in some embodiments, also includes an insert flange 150 protruding radially from insert 60. Referring now to FIG. 8 and FIG. 9A, in some embodiments, second hub 30 includes an insert recess 78 defined partially around the inner perimeter of second hub 30. Insert recess 78 is generally shaped for receiving insert flange 150. Threaded insert 60 is generally inserted axially into second radial slot 32, and insert flange 150 engages insert recess 78, as seen in FIG. 9B. In some embodiments, insert 60 is secured to second hub 30 by a press fit, or an interference or friction fit, between the outer diameter of insert 60 and inner diameter of second hub 30. One embodiment of second hub 30 provides a removable insert 60 that can be removed and replaced by a user if the threaded region 26 becomes worn or damaged or if a different thread configuration is desired. As seen in FIGS. 9A and 9B, threaded region 26 in some embodiments extends only partially around the inner perimeter of insert 60. Additionally, multiple inserts 60 having different thread configurations can be interchangeably inserted into and removed from a second hub 30, allowing one clamp apparatus to be interchangeably used with various shafts having differing shaft thread configurations. Further, an interchangeable insert configuration allows one clamp apparatus 10 having interchangeable inserts of differing material properties to be used with different shafts.

Figure 10:
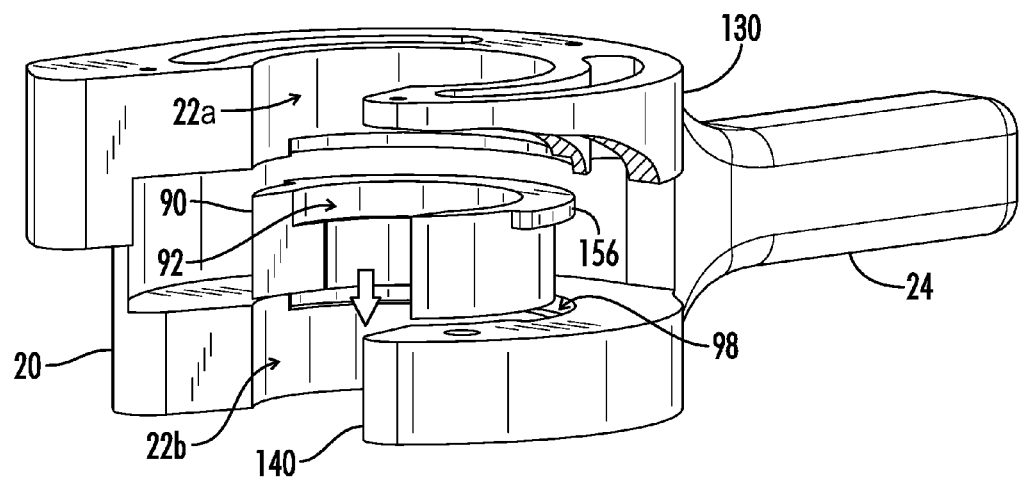
FIG. 10 illustrates a partially broken away exploded perspective view of one embodiment of a first hub and a second bushing.
Figure 11:
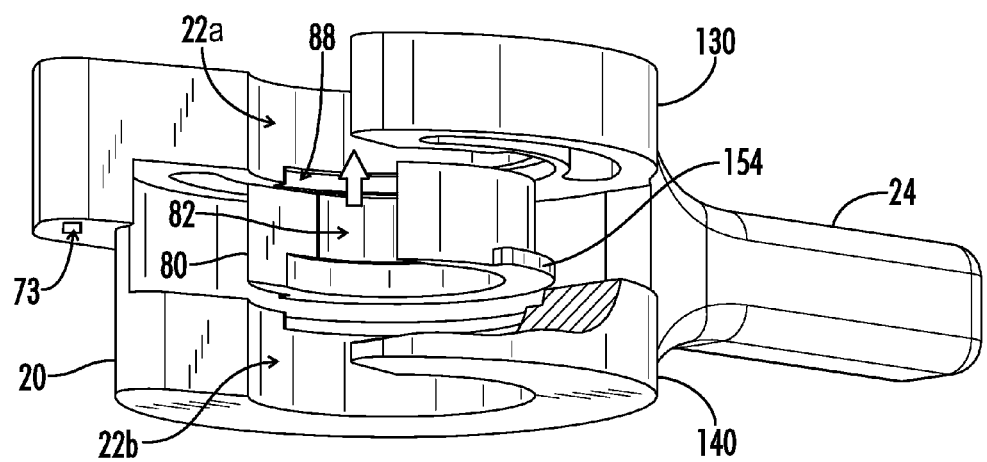
FIG. 11 illustrates a partially broken away exploded perspective view of one embodiment of a first hub and a first bushing.

Referring again to FIG. 3, in some embodiments, first hub 20 is configured to accept first and second bushings 80, 90. As seen in FIG. 6, first hub 20 includes a first layer 130 and a second layer 140 separated by a hub gap 132. First and second layers together define first radial slot 22, seen in FIG. 4 and FIG. 5. Referring now to FIG. 10 and FIG. 11, in some embodiments, first radial slot 22 includes an upper first radial slot 22a, defined in first layer 130, and a lower first radial slot 22b, defined in second layer 140.

A first bushing 80 is disposed in upper first radial slot 22a, as seen in FIG. 11. First bushing 80 includes a U-shape and defines a first radial bushing opening 82 generally aligned with upper first radial slot 22a. First bushing 80 in some embodiments is a flange bushing including first bushing flange 154 extending radially outward from first bushing 80. First bushing flange 154 engages first bushing flange recess 88 defined on the inner perimeter of first layer 130. In some embodiments, first bushing 80 engages upper first radial slot 22a by a press-fit, or an interference or friction fit, between the outer first bushing diameter and the inner diameter of upper first radial slot 22a.

A second bushing 90 is inserted in lower first radial slot 22b, as seen in FIG. 10. Second bushing 90 includes a U-shape and defines a second radial bushing opening 92, generally aligned with lower first radial slot 22b. Second bushing 90 in some embodiments is a flange bushing including a second bushing flange 156 extending radially outward from second bushing 90. Second bushing flange 156 engages second bushing flange recess 98 defined on the inner perimeter of second layer 140 on first hub 20. In some embodiments, second bushing 90 engages lower first radial slot 22*b* by a press-fit, or an interference or friction fit, between the outer second bushing diameter and the inner diameter of lower first radial slot 22*b*.

Figure 12:
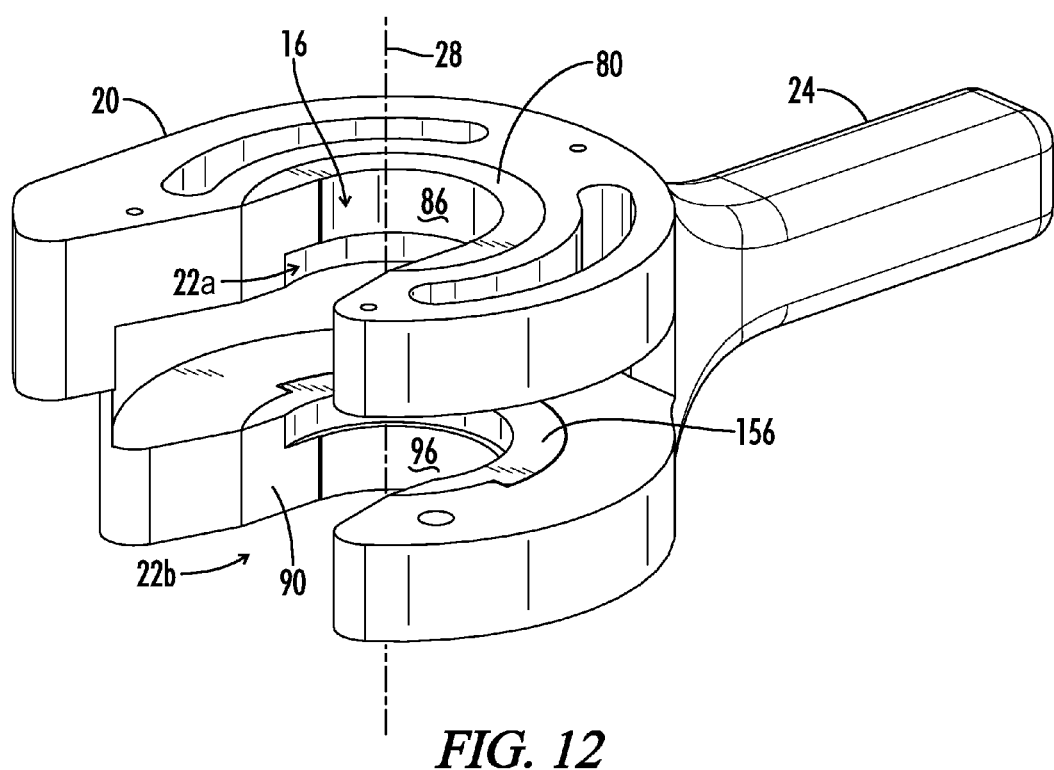
FIG. 12 illustrates a perspective view of one embodiment of a first hub with first and second bushings.

Referring now to FIG. 12, first and second bushings 80, 90 define part of axial bore 16 along hub axis of rotation 28. In some embodiments, first bushing 80 defines a first bushing bore substantially aligned with the axial bore and a substantially smooth first bushing bore surface 86; and second bushing 90 defines a second bushing bore substantially aligned with the axial bore 16 and a substantially smooth second bushing bore surface 96. Each first and second bushing 80, 90 include a bushing radius substantially equal to the outer diameter the shaft on which clamp 10 is to be secured. In some embodiments, first and second bushings 80, 90 are interchangeable with additional bushings not shown having different dimensions for adapting to shafts having differing diameters. As such, an operator can use a single clamp 10 with different bushings having different bushing configurations for applying the clamp apparatus to shafts of various dimensions. It is understood that, in some embodiments, first and/or second bushings 80, 90 can be threaded for engaging corresponding thread structure on a shaft. It is further understood that, in some embodiments, insert 60 can include no threaded region. In some embodiments, first and second bushings are dimensioned to provide an interference fit with the shaft for biasing the shaft toward threaded insert 60, seen in FIGS. 9A and 9B, allowing a secure engagement of shaft threads with insert threads on insert 60.

It will be further appreciated by those of skill in the art that, in some embodiments in accordance with the present invention, first hub 20 can operate without any first or second bushings 80, 90 installed on first hub 20. Additionally, it will be further appreciated that threaded region 26 can be integrally formed on second hub 30 in some embodiments, and second hub 30 can operate without any separate threaded insert disposed therein.

Referring again to FIG. 8, in some embodiments, first and second hubs can be angularly locked relative to each other using a latch or locking mechanism. In one embodiment, second hub 30 includes a latch housing 76 defining an opening for slidably receiving a latch member 72, seen in FIG. 3. Latch member 72 is positioned in latch housing 76 and is attached to lever 70. In some embodiments, latch member 72 engages a latch slot 73, seen in FIG. 11, for selectively locking clamp 10 in a closed position. Referring again to FIG. 1, during use, a user can press lever 70 using one or more fingers to disengage latch member 72 from latch slot 73, thereby allowing second hub 30 to be rotated about hub axis of rotation relative to first hub 20 using first and second handles 24, 34, as seen in FIG. 2A. In some embodiments, a latch spring 74 is disposed in latch housing 76 for biasing latch member 72 toward latch slot 73. It is understood that other latch or locking mechanisms known in the art can be used to angularly secure first and second hubs in a locked position.

Thus, although there have been described particular embodiments of the present invention of a new and useful Pivoting Hub Nut, it is not intended that such references be construed as limitations upon the scope of this invention except as set forth in the following claims.

What is claimed is:

1. A clamping apparatus for clamping a wheel to a shaft on a wheel servicing machine, the apparatus comprising:
 a first hub defining a first radial slot;
 a second hub pivotally attached to the first hub, the second hub defining a second radial slot, the second hub being rotatable relative to the first hub about a hub axis of rotation;
 an axial bore defined through the first and second hubs along the hub axis of rotation, the axial bore shaped for receiving the shaft;
 a first handle extending from the first hub; and
 a second handle extending from the second hub.

2. The apparatus of claim 1, further comprising:
 a threaded region disposed on at least one of the first and second hubs substantially facing the axial bore.

3. A clamping apparatus for use on a threaded shaft, the apparatus comprising:
 a first hub;
 a second hub pivotally attached to the first hub, wherein the first and second hubs are axially aligned along a hub axis of rotation, and wherein the first and second hubs define an axial bore centered along the hub axis of rotation;
 a threaded insert disposed in the axial bore;
 a first handle extending radially from the first hub; and
 a second handle extending radially from the second hub.

4. The apparatus of claim 3, further comprising:
 the first hub defining a first radial slot therein; and
 the second hub defining a second radial slot therein,
 wherein the first and second radial slots are shaped for receiving the threaded shaft.

5. The apparatus of claim 4, wherein:
 the first and second handles define a handle axis when the clamp is in a closed position;
 the first radial slot defines a first slot axis oriented at a first slot angle;
 the second radial slot defines a second slot axis oriented at a second slot angle; and
 the first and second slots define a slot offset angle equal to the difference between the first and second slot angles when the first and second handles are aligned along the handle axis.

6. The apparatus of claim 5, wherein the slot offset angle is between about eighty degrees and about one-hundred degrees.

7. The apparatus of claim 4, wherein the first and second radial slots are angularly offset when the first and second handles are angularly aligned relative to the hub axis of rotation.

8. The apparatus of claim 3, further comprising:
 a first layer extending from the first hub;
 a second layer extending from the first hub; and
 the first hub defining a first hub gap between the first and second layers,
 wherein the second hub is pivotally housed in the hub gap.

9. The apparatus of claim 8, further comprising:
 a first bushing disposed on the first layer, the first bushing defining a first radial bushing opening and a first bushing bore, the first bushing bore axially aligned with the axial bore; and
 a second bushing disposed on the second layer, the second bushing defining a second radial bushing opening and a second bushing bore, the second bushing bore axially aligned with the axial bore.

10. The apparatus of claim 9, wherein:
 the first bushing includes a substantially smooth first bushing bore surface, and
 the second bushing includes a substantially smooth second bushing bore surface.

11. The apparatus of claim 3, further comprising a latch disposed on the clamping apparatus operative for selectively locking the first and second hubs in a closed position.

12. The apparatus of claim 3, further comprising:
the first hub defining a first angular slot;
the second hub defining a second angular slot; and
a first pivot pin extending through the first and second angular slots pivotally joining the first and second hubs.

13. The apparatus of claim 12, further comprising:
the first hub defining a third angular slot;
the second hub defining a fourth angular slot; and
a second pivot pin extending though the third and fourth angular slots pivotally joining the first and second hubs.

14. The apparatus of claim 12, further comprising a cover plate disposed on the first hub.

15. A pivoting hub nut apparatus for securing a wheel to a threaded shaft of a wheel servicing machine, the apparatus comprising:
a first handle having a first U-shaped hub extending from the first handle, the first U-shaped hub defining a first radial slot shaped for receiving the shaft, the first U-shaped hub being rotatable about a hub axis of rotation; and
a second handle having a second U-shaped hub extending from the second handle, the second U-shaped hub defining a second radial slot shaped for receiving the shaft, the second U-shaped hub being rotatable about the hub axis of rotation;
an axial bore defined through the first and second U-shaped hubs along the hub axis of rotation,
wherein the first U-shaped hub is pivotally attached to the second U-shaped hub.

16. The hub nut of claim 15, wherein the first and second radial slots are axially aligned.

17. The hub nut of claim 15, further comprising:
the pivoting hub nut defining an axial bore; and
a partially threaded region defined on the hub nut facing the axial bore.

18. The hub nut of claim 15, further comprising a latch disposed on the second U-shaped hub, the latch positioned for selectively locking the hub nut in a closed position.

19. A clamping apparatus for securing a wheel to a threaded shaft on a wheel servicing machine, the apparatus comprising:
a first hub;
a second hub pivotally attached to the first hub;
a partially-threaded U-shaped insert disposed on the second hub, the insert having a thread configuration adapted for engaging the threaded shaft;
a first handle protruding radially from the first hub; and
a second handle protruding radially from the second hub,
wherein the first and second hubs are axially aligned along a hub axis of rotation and are angularly offset when the first and second handles are collinearly aligned in a closed position.

20. The apparatus of claim 19, wherein the clamping apparatus is balanced about the hub axis of rotation when the first and second handles are in the closed position.

21. The apparatus of claim 20, further comprising a latch disposed on the first handle for selectively locking the first and second hubs in the closed position.

22. The apparatus of claim 19, wherein;
the first and second hubs are rotatable relative to the threaded shaft in the closed position; and
the first threaded U-shaped insert threadedly engages the threaded shaft.

* * * * *